United States Patent [19]

Rokugo et al.

[11] Patent Number: 4,727,542

[45] Date of Patent: Feb. 23, 1988

[54] HIGHER-ORDER MULTIPLEX DIGITAL COMMUNICATION SYSTEM WITH IDENTIFICATION PATTERNS SPECIFIC TO LOWER-ORDER MULTIPLEX DIGITAL SIGNALS

[75] Inventors: Yoshinori Rokugo; Hiroshi Asano, both of Tokyo, Japan

[73] Assignee: NEC Corporation, Tokyo, Japan

[21] Appl. No.: 22,612

[22] Filed: Mar. 4, 1987

Related U.S. Application Data

[63] Continuation of Ser. No. 573,744, Jan. 25, 1984, abandoned.

[30] Foreign Application Priority Data

Jan. 25, 1983 [JP] Japan .................. 58-10248

[51] Int. Cl.$^4$ .............................................. H04J 3/02
[52] U.S. Cl. ................................. 370/112; 370/110.1; 370/91
[58] Field of Search ..................... 370/91, 84, 112, 100, 370/110.1

[56] References Cited

U.S. PATENT DOCUMENTS

| | | | |
|---|---|---|---|
| Re. 29,215 | 5/1977 | Carney et al. | 370/112 |
| 4,160,128 | 7/1979 | Texier | 370/84 |
| 4,244,046 | 1/1981 | Brouard et al. | 370/84 |
| 4,271,508 | 6/1981 | Schenk | 370/112 |
| 4,504,943 | 3/1985 | Nagano et al. | 370/84 |
| 4,616,361 | 10/1986 | Strehl | 370/110.1 |

FOREIGN PATENT DOCUMENTS 0054120  6/1982  European Pat. Off. ............ 370/112

OTHER PUBLICATIONS

"A New Range of Digital Transmission Equipment" by Hardwick et al., Systems Technology, Sep. 1979, No. 32, pp. 48–52.

"Higher-Order Digital Multiplexors" by Hamacher et al., Ericsson Review, No. 4, 1981, vol. 58.

Primary Examiner—Douglas W. Olms
Attorney, Agent, or Firm—Sughrue, Mion, Zinn, Macpeak & Seas

[57] ABSTRACT

On multiplexing a predetermined number of lower-order multiplex digital transmission signals of a common frame period into a higher-order multiplex digital communication signal, an identification pattern (X, Y, Z) is inserted in each frame of each transmission signal. The identification patterns are specific to the respective transmission signals. The identification patterns in each frame period of the respective transmission signals are multiplexed into a single pattern (I1x, I2x, I3x, I1y, I2y, I3y, I1z, I2z, I3z) in the communication signal and used to indicate lower-order multiplex digital signal receivers to which the respective transmission signals should be directed. After the communication signal is demultiplexed into lower-order multiplex digital reception signals, the identification patterns are detected with frame synchronism established between the lower-order transmission and reception signals. Each identification pattern may consist of a preselected number of binary bits where two to the power of the preselected number should not be less than the predetermined number.

6 Claims, 6 Drawing Figures

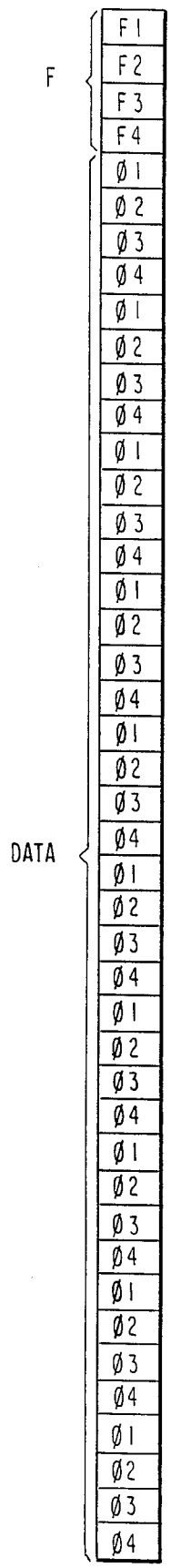
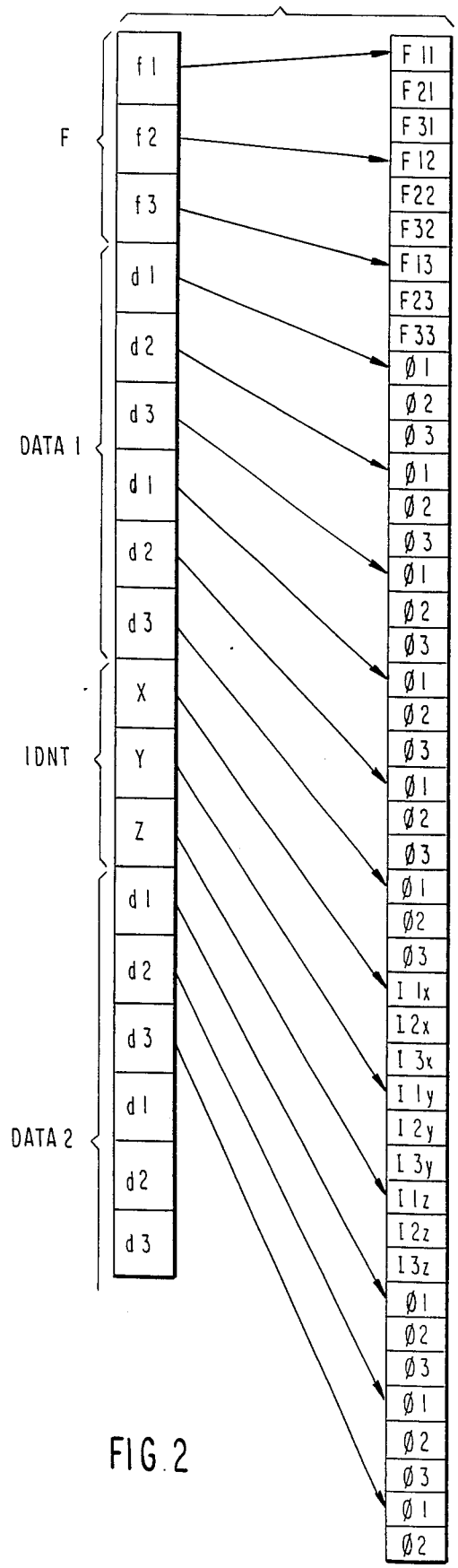
FIG. 1 PRIOR ART
FIG. 2

HIGHER-ORDER MULTIPLEX DIGITAL COMMUNICATION SYSTEM WITH IDENTIFICATION PATTERNS SPECIFIC TO LOWER-ORDER MULTIPLEX DIGITAL SIGNALS

This is a continuation of application Ser. No. 573,744, filed Jan. 25, 1984, now abandoned.

BACKGROUND OF THE INVENTION

This invention relates to a multiplex digital communication system or network of the type wherein communication is carried out by a higher-order multiplex digital signal into which a plurality of lower-order multiplex digital signals are multiplexed.

Such a multiplex digital communication system comprises a higher-order multiplex digital signal transmitter for transmitting a higher-order multiplex digital transmission signal to a transmission medium as a higher-order multiplex digital communication signal. The transmitter is accompanied by a plurality of lower-order multiplex digital signal transmitters or multiplexers. Each multiplexer produces a lower-order multiplex digital transmission signal. The higher-order transmitter multiplexes such lower-order multiplex digital transmission signals into the higher-order multiplex digital transmission signal.

A higher-order multiplex digital signal receiver receives the communication signal from the transmission medium as a higher-order multiplex digital reception signal. The receiver demultiplexes the reception signal into a plurality of lower-order multiplex digital reception signals, which are reproductions of the respective lower-order multiplex digital transmission signals. The receiver is accompanied by a plurality of lower-order multiplex digital signal receivers or demultiplexers. The higher-order receiver distributes the lower-order reception signals to the respective demultiplexers.

In a conventional multiplex digital communication system of the type described, a plurality of system numbers are assigned to the respective multiplexers and to the respective demultiplexers. The lower-order transmission signals are multiplexed in the order of the system numbers of the multiplexers for the respective lower-order transmission signals. The lower-order reception signals appear in the order of the system numbers. In order to correctly distribute the lower-order reception signals to the respective demultiplexers, exact frame synchronism must be established between the higher-order transmission and reception signals. The higher-order transmitter and receiver must therefore be designed so as to establish the frame synchronism between higher-rate signals and must comprise high-speed elements.

SUMMARY OF THE INVENTION

It is therefore an object of the present invention to provide a multiplex digital communication system or network of the type described, in which it is unnecessary to establish frame synchronism between higher-rate signals.

It is another object of this invention to provide a transmitter for use in the multiplex digital communication system of the type described.

It is still another object of this invention to provide a receiver for use in the multiplex digital communication system of the type described.

A transmitter to which this invention is applicable, is for transmitting a higher-order multiplex digital signal by multiplexing a predetermined number of lower-order multiplex digital signals into the higher-order multiplex digital signal with frames of the respective lower-order multiplex digital signals aligned into a frame of the higher-order multiplex digital signal. According to this invention, the transmitter comprises pattern inserting means for inserting lower-order identification patterns in the frames of the respective lower-order multiplex digital signals to identify the lower-order multiplex digital signals, and signal multiplexing means for multiplexing the lower-order multiplex digital signals into the higher-order multiplex digital signal with the lower-order identification patterns of the respective aligned frames multiplexed into a higher-order identification pattern in each frame of the higher-order multiplex digital signal.

A higher-order multiplex digital signal receiver according to this invention, is for use in combination with a plurality of lower-order multiplex digital signal receivers and in receiving a higher-order multiplex digital signal into which a predetermined number of lower-order multiplex digital transmission signals are multiplexed with a plurality of identification patterns included in each frame of the higher-order multiplex digital signal. The identification patterns are for identifying the lower-order multiplex digital transmission signals and indicating the lower-order multiplex digital signal receivers. The higher-order multiplex digital signal receiver comprises demultiplexing means for demultiplexing the higher-order multiplex digital signal into a plurality of lower-order multiplex digital reception signals which are reproductions of the respective lower-order multiplex digital transmission signals. Each lower-order multiplex digital reception signal includes the identification pattern identifying the lower-order multiplex digital transmission signal of which the above-mentioned each lower-order multiplex digital reception signal is a reproduction. The higher-order multiplex digital signal receiver furthermore comprises distributing means for distributing the lower-order multiplex digital reception signals towards the lower-order multiplex digital signal receivers indicated by the identification pattern included in the respective lower-order multiplex digital reception signals.

A multiplex digital communication system to which this invention is applicable, comprises a transmitter for multiplexing a plurality of lower-order multiplex digital transmission signals into a higher-order multiplex digital transmission signal and for sending the higher-order multiplex digital transmission signal to a transmission medium as a multiplex digital communication signal and a receiver for receiving the multiplex digital communication signal from the transmission medium as a higher-order multiplex digital reception signal and for demultiplexing the reception signal into a plurality of lower-order multiplex digital reception signals which are reproductions of pretermined ones of the lower-order multiplex digital transmission signals. Acccording to this invention, a plurality of bit-interleaaved identification patterns are included in each frame of the multiplex digital communication signal, which identification patterns are for identifying the lower-order multiplex digital transmission signals.

BRIEF DESCRIPTION OF THE DRAWING

FIG. 1 shows a format of a conventional higher-order multiplex digital communication signal;

FIG. 2 exemplifies a set of signal formats for use in a multiplex digital communication system according to the instant invention;

DESCRIPTION OF THE PREFERRED EMBODIMENTS

Referring to FIG. 1, a conventional multiplex digital communication system will be described at first in order to facilitate an understanding of the present invention. It is known in the art that the system comprises a transmitter for multiplexing a plurality of lower-order multiplex digital transmission signals into a higher-order multiplex digital transmission signal and for sending the higher-order transmission signal to a transmission medium as a multiplex digital communication signal. Merely for convenience of description, it will be assumed that the lower-order transmission signals are four in number. The lower-order transmission signals will be called first through fourth lower-order multiplex digital transmission signals. It is possible to understand that system numbers 1 through 4 are assigned to the first through the fourth lower-order transmission signals, respectively.

As depicted in FIG. 1, a frame of the multiplex digital communication signal comprises a frame synchronizing pattern F and a data bit sequence DATA following the frame synchronizing pattern F. In the example being illustrated, the frame synchronizing pattern F consists of four binary bits F1, F2, F3, and F4. In the data bit sequence DATA, data bits $\emptyset 1$'s of the first lower-order transmission signal are bit-interleaved with data bits $\emptyset 2$'s, $\emptyset 3$'s, and $\emptyset 4$'s of the second through the fourth lower-order transmission signals.

In a higher-order multiplex digital signal receiver of the system, the multiplex digital communication signal is received as a higher-order multiplex digital reception signal and demultiplexed into first through fourth lower-order multiplex digital reception signals, which are reproductions of the first through the fourth lower-order transmission signals, respectively. The receiver is accompanied by first through fourth lower-order multiplex digital signal receivers or demultiplexers. It will be surmised that the first through the fourth lower-order reception signals should be distributed to the first through the fourth demultiplexers, respectively. For the correct distribution, exact frame synchronism must be established between the higher-order transmission and reception signals.

Figure 3:
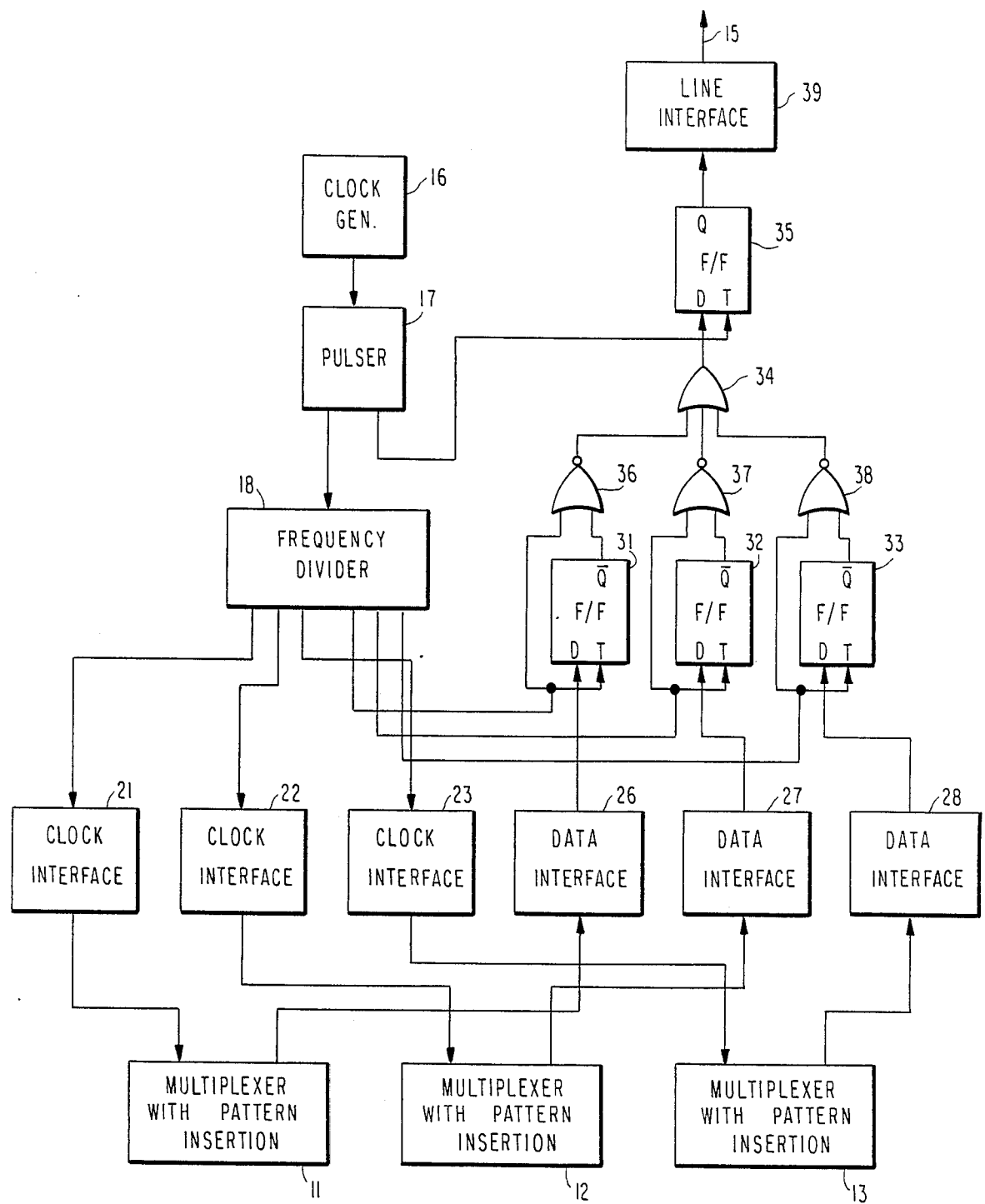
FIG. 3 is a block diagram of a transmitter for use in a multiplex digital communication system according to a first embodiment of this invention.

Referring now to FIGS. 2 and 3, a higher-order multiplex digital signal transmitter is for use in a multiplex digital communication system according to a first embodiment of this invention. The transmitter comprises first through third lower-order digital signal multiplexers 11, 12, and 13 for producing first through third lower-order multiplex digital transmission signals, respectively.

It is possible to assume without loss of generality that such lower-order transmission signals have a common frame period. As will become clear as the description proceeds, the lower-order transmission signals are multiplexed into a higher-order multiplex digital transmission signal with frames of the respective lower-order transmission signals aligned into a frame of the higher-order transmission signal. The higher-order transmission signal has a frame period which may or may not be equal to the common frame period. The higher-order transmission signal is converted to a signal suitable for transmission through a transmission medium or line 15 and then delivered thereto as a higher-order multiplex digital communication signal. The multiplexers 11 through 13 may be lower-order multiplex digital signal transmitters, at least one of which is situated at a remote location.

A frame of the first lower-order transmission signal is exemplified in FIG. 2 as a representative of the lower-order transmission signals, In succession, the frame comprises a frame synchronizing pattern F, a first data bit sequence DATA1, an identification pattern IDNT, and a second data bit sequence DATA2. It is assumed that first through third discrete digital transmission signals are multiplexed into the first lower-order transmission signal. The synchronizing pattern F consists of three binary bits f1, f2, and f3. In the first data bit sequence DATA1, data bits d1's of the first discrete digital transmission signal are bit-interleaved with data bits d2's and d3's of the second and the third discrete digital transmission signals. For the transmitter being illustrated, it is sufficient that the identification pattern IDNT should consist of first and second binary bits X and Y although a third binary bit Z is depicted. As will later be described more in detail, the identification pattern IDNT is encoded so as to identify the first lower-order transmission signal. The second data bit sequence DATA2 is similar in structure to the first data bit sequence DATA1. The data bits are for representing data information and other service information.

FIG. 2 furthermore shows a part of a frame of the higher-order transmission signal. In the higher-order transmission signal frame, the frame synchronizing pattern bits f1 through f3 of the first lower-order transmission signal are bit-interleaved with similar frame synchronizing pattern bits of the second and the third lower-order transmission signals to bacome a higher-order frame synchronizing pattern consisting of binary bits F11, F21, F31, F12, F22, F32, F13, F23, and F33. As in the conventional higher-order transmission signal, the data bits of the first through the third lower-order transmission signals are multiplexed into data bits $\emptyset 1$, $\emptyset 2$, $\emptyset 3$, $\emptyset 1$, $\emptyset 2$, $\emptyset 3$, . . . .

The identification patterns IDNT's included in the first through the third lower-order transmission signals, will be called first through third identification patterns, respectively. The binary bits X, Y, and Z of the first identification pattern are bit-interleaved with the binary bits of the second and the third identification patterns into a higher-order identification pattern consisting of binary bits I1x, I2x, I3x, I1y, I2y, I3y, I1z, I2z, and I3z. In contrast to the higher-order identification pattern, each of the first through the third identification patterns may be named a lower-order identification pattern depending on the circumstances.

Referring more particularly to FIG. 3, the transmitter comprises a clock generator 16 for generating a clock sequence of a bit rate of the higher-order transmission signal. The clock sequence will therefore be named a higher-rate clock sequence as the case may be. Frames of the lower-order and the higher-order transmission signals are defined by the clock sequence. The clock sequence is supplied to a pulser 17 and converted to a rectangular signal, which is fed to a frequency divider 18 and frequency divided into lower-rate clock sequence. In the example being illustrated, the frequency divider 18 may be a trisect counter. First through third lower-rate clock sequences produced by the frequency divider 18 are delivered to first through third clock interface circuits 21, 22, and 23, respectively, and converted to signals which are suitable for use in controlling the multiplexers 11 through 13. The signals produced by the first through the third clock interface circuits 21 to 23 will be referred to again as first through third lower-rate clock sequences.

Driven by the first through the third lower-rate clock sequences, the first through the third multiplexers 11 to 13 produce the first through the third lower-order transmission signals of the format described in conjunction with FIG. 2. More specifically, each of the multiplexers 11 through 13 is for producing a lower-order multiplex digital transmission signal by multiplexing, by the use of the lower-rate clock sequence supplied thereto, discrete digital transmission signals supplied thereto through lines (not shown) therefor. At the same time, the multiplexer 11, 12, or 13 places the frame synchronizing pattern F (FIG. 2) and the lower-order identification pattern IDNT in each frame of the lower-order transmission signal thereby produced. In other words, the multiplexers 11 through 13 serve also as pattern inserting means for inserting lower-order identification patterns IDNT's in the frames of the respective lower-order transmission signals.

The first through the third lower-order multiplex digital transmission signals are converted by first through third data interface circuits 26, 27, and 28, respectively, to signals suitable for processing in the following stages which will presently be described. The signals so converted, will again be called first through third lower-order multiplex digital transmission signals.

The first through the third lower-order multiplex digital transmission signals are fed to first through third flip-flops 31, 32, and 33, respectively. The frequency divider 18 supplies the first through the third flip-flops 31 to 33 with first through third timing signals, which have a one-third phase offset relative to one another so that the lower-order transmission signals may be written in the respective flip-flops 31 to 33 for multiplexing into the higher-order multiplex digital transmission signal. After temporarily stored in the respective flip-flops 31 through 33, the first through the third lower-order transmission signals are delivered to a gate circuit 34 and thence to a single flip-flop 35 through first through third gates 36, 37, and 38, respectively, which are controlled by the first through the third timing signals, respectively. Timed by a rectangular signal, similar to that delivered from the pulser 17 to the frequency divider 18, the single flip-flop 35 produces the higher-order multiplex digital transmission signal, which is converted to the digital communication signal by a line interface circuit 39 and thereafter transmitted to the transmission medium 15.

Figure 4:
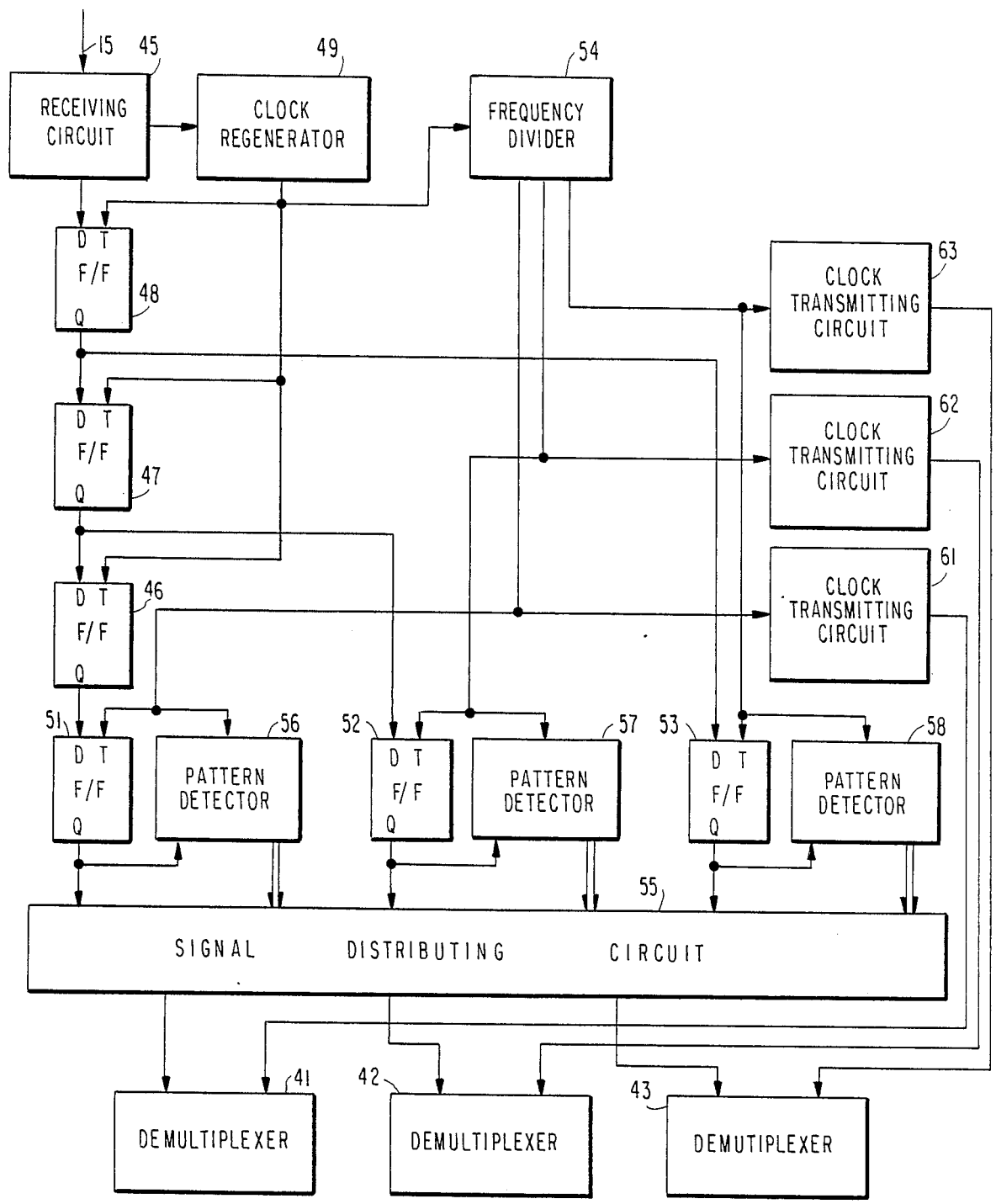
FIG. 4 is a block diagram of receiver for use as a counterpart of the transmitter depicted in FIG. 3.

Referring to FIG. 4, a higher-order multiplex digital signal receiver is for use in the digital communication network which comprises the transmitter illustrated with reference to FIG. 3. It will be assumed merely for brevity of description that the receiver is for receiving all the lower-order multiplex digital transmission signals of the higher-order multiplex digital communication signal and consequently comprises first through third lower-order digital signal demultiplexers 41, 42, and 43, which may be lower-order multiplex digital signal receivers.

The higher-order multiplex digital signal receiver comprises a receiving circuit 45 for receiving the digital communication signal from the transmission medium 15 and for converting the same to a higher-order multiplex digital reception signal of the format described in connection with FIG. 2. The reception signal is delivered to a shift register comprising first through third stages 46, 47, and 48, each of which may be a flip-flop. A part of the reception signal is supplied to a clock regenerator 49, which regenerates the higher-rate clock sequence used in the communication signal and accordingly in the reception signal. The clock regenerator 49 includes a pulser (not shown) and produces a regenerated clock sequence as a rectangular signal. The regenerated clock sequence is used, among others, as a shift pulse sequence for the shift register.

Timed by the shift pulse sequence, the first through the third stages 46 to 48 supply first through third demultiplexed signals to first through thrid flip-flops 51, 52, and 53, respectively. A frequency divider 54 is for frequency dividing the regenerated clock sequence to produce first through third lower-rate local clock sequences, which are used in loading the respective flip-flops 51 through 53 with the demultiplexed signals. The first through the third flip-flops 51 to 53 supply a signal distributing circuit 55 with first through third lower-order multiplex digital reception signals which are reproductions of the first through the third multiplex digital transmission signals and each of which has the format comprising the frame synchronizing pattern F and others as illustrated in FIG. 2. The distributing circuit 55 will shortly be described more in detail.

The first through the third lower-order reception signals are delivered also to first through third identification pattern detecting circuits 56, 57, and 58, respectively. Although not depicted in detail, each of the detection circuits 56 through 58 comprises a frame counter, a synchronizing pattern detector, and an identification pattern detector and is for detecting the frame synchronizing pattern F (FIG. 2) at first by the frame counter and the synchronizing pattern detector. Subsequently, the identification pattern IDNT is detected by the frame counter and the identification pattern detector. The first through the third detecting circuits 56 to 58 produce first through third reception pattens which correspond to the first through the third identification patterns, respectively.

The frequency divider 54 delivers the first through the third lower-rate local clock sequences to the first through the third demultiplexers 41 to 43 through first through third clock transmitting circuits 61, 62, and 63, respectively. Responsive to the first through the third reception patterns, the distributing circuit 55 delivers the frame synchronizing pattern bits and the data bits of the first through the third lower-order reception signals to the first through the third demultiplexers 41 to 43. It is therefore possible to understand that the first through the third reception patterns and consequently the first through the third identification patterns are indicative of the first through the third demultiplexers 41 to 43, respectively. It will now be appreciated that the identification pattern IDNT makes it possible to correctly distribute the lower-order reception signals to the respective demultiplexers 41 through 43 without the necessity of exact frame synchronism between the higher-rate transmission and reception signals.

Figure 5:
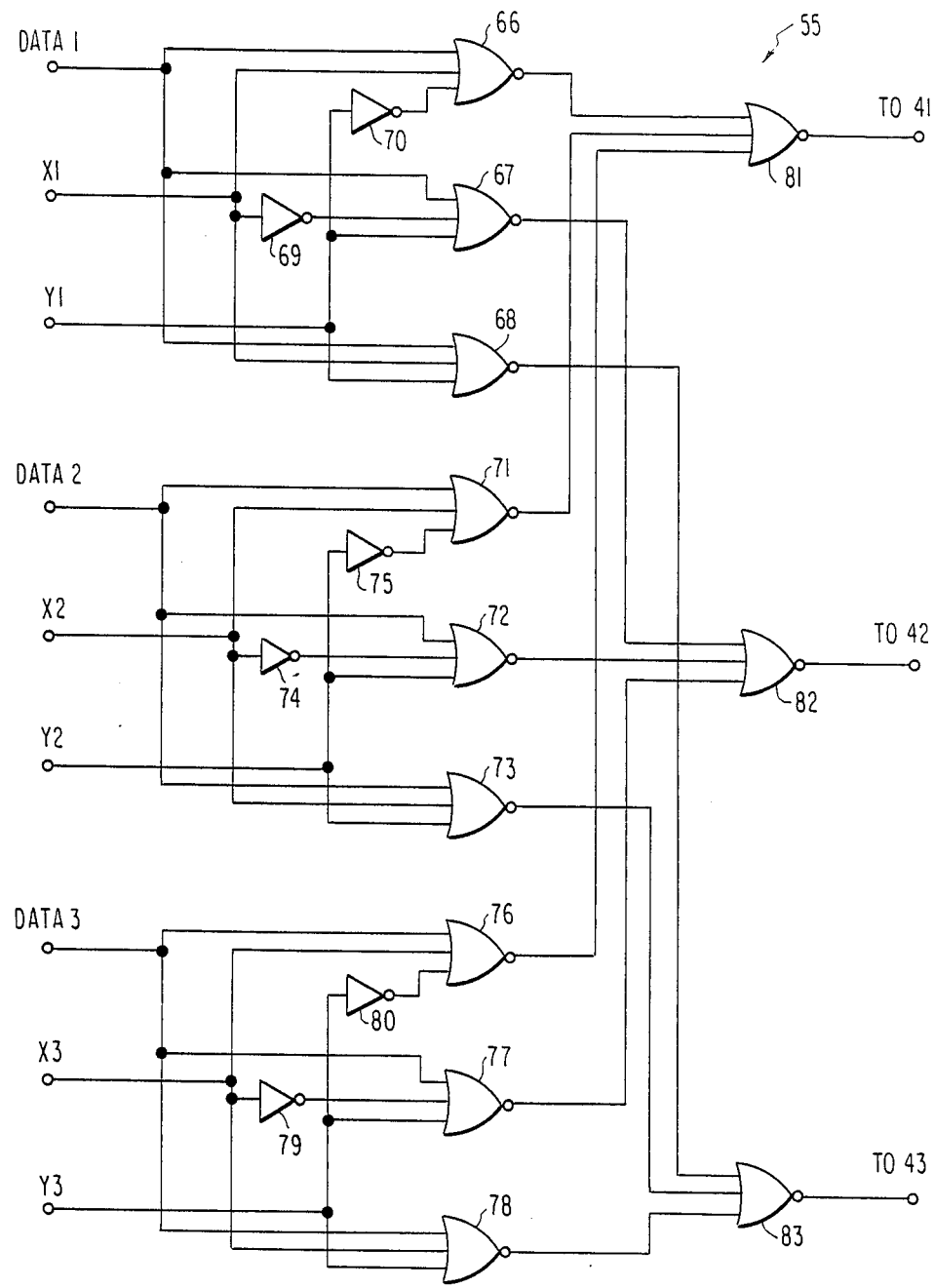
FIG. 5 is a circuit diagram of a gating circuit for use in the receiver illustrated in FIG. 4.

Turning to FIG. 5, the distributing circuit 55 is a gate circuit. As pointed out heretobefore, only first and second binary bits X and Y are sufficient as each identification pattern IDNT for the higher-order multiplex digital signal transmitter and receiver being illustrated. Let the binary bits X and Y of the first through the third identification patterns be denoted by X1 and Y1, X2 and Y2, and X3 and Y3 and be given binary zeros, binary one and zero, and binary zero and one, respectively. The binary bits X1 through X3 and Y1 through Y3 are given binary ones if a trouble occurs in the higher-order multiplex digital communication signal and consequently in one or more of the first through the third lower-order multiplex digital reception signals. Incidentally, it would readily be understood that the identification patterns are capable of identifying the lower-order transmission or reception signals of a number which is not greater than two to the power of the number of binary bits in each identification pattern IDNT.

The distributing circuit 55 comprises a first set of first through third gates 66, 67, and 68 supplied in common with the first lower-order multiplex digital reception signal indicated at DATA1 (the reference symbol used in FIG. 2 for the first data bit sequence being used merely for simplicity of denotation). The first binary bit X1 of the first reception pattern controls the first through the third gates 66 to 68 directly, through a first inverter 69, and directly, respectively. The second binary bit Y1 controls the first gate 66 through a second inverter 70 and, on the other hand, the other gates 67 and 68 directly. A second set of first through third gates 71, 72, and 73 are supplied with the second lower-order reception signal indicated at DATA2. Through first and second inverters 74 and 75, the respective binary bits X2 and Y2 of the second reception pattern control the second-set gates 71 through 73 in the manner described as regards the first-set gates 66 through 68. A third set of first through third gates 76, 77, and 78 are supplied with the third lower-order reception signal indicated at DATA3. The first and the second binary bits X3 and Y3 of the third reception pattern likewise control the third-set gates 76 through 78 through first and second inverters 79 and 80, respectively. The first gates 66, 71, and 76 of the first through the third sets deliver their outputs to a first output gate 81. The second gates 67, 72, and 77 of the respective sets deliver their outputs to a second output gate 82. The third gates 68, 73, and 78 of the respective sets deliver their outputs to a third output gate 83.

Only when the first and the second binary bits X1 and Y1 of the first reception pattern are both binary zeros, the first lower-order reception signal DATA1 is fed to the first demultiplexer 41 (FIG. 4) through the first-set first gate 66 and the first output gate 81. When the first and the second binary bits X2 and Y2 of the second reception pattern are binary one and zero, respectively, the second lower-order reception signal DATA2 is fed to the second demultiplexer 42 through the second-set second gate 72 and the second output gate 82. When the first and the second binary bits X3 and Y3 of the third reception pattern are binary zero and one, respectively, the third lower-order reception signal DATA3 is fed to the third demultiplexer 43 through the third-set third gate 78 and the third output gata 83.

It is now readily possible to delete the reception patterns from the signals delivered from the first through the third output gates 81 to 83 towards the respective demultiplexers 41 through 43, which need not the reception patterns. When the first and the second binary bits of at least one of the first through the third reception patterns are both binary ones, the distributing circuit 55 does not allow passage therethrough of the lower-order reception signal which includes that at least one reception pattern.

Figure 6:
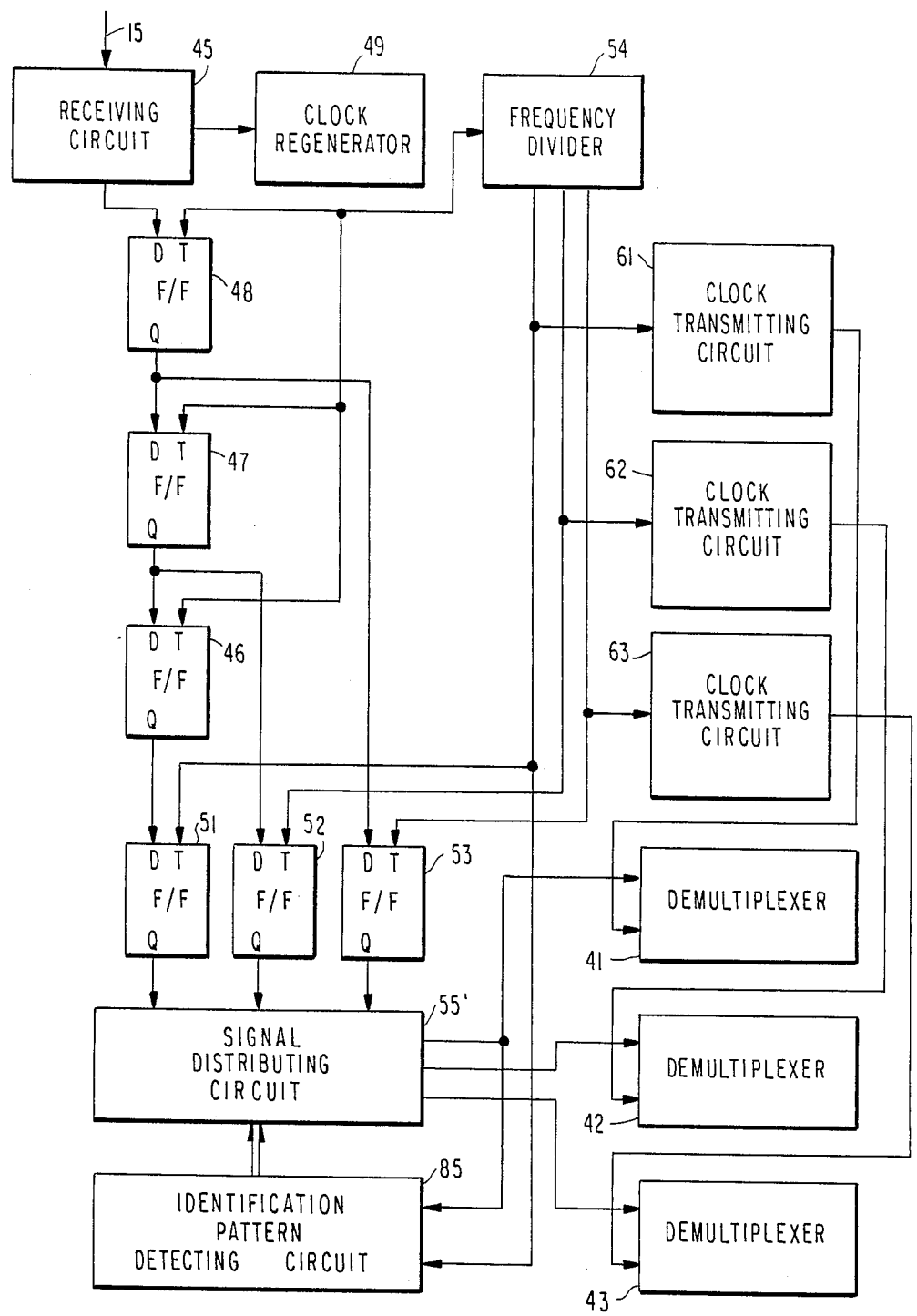
FIG. 6 is a block diagram of a receiver for use in a multiplex digital communication system according to a second embodiment of this invention.

Referring finally to FIG. 6, a higher-order multiplex digital signal receiver is for use in a digital communication network according to a second embodiment of this invention and comprises similar parts designated by like reference numerals. It will be assumed that the receiver being illustrated is for use as a counterpart of the transmitter illustrated with reference to FIG. 3 and is for receiving all the lower-order multiplex digital transmission signals of the higher-order multiplex digital communication signal.

A signal distributing circuit 55' distributes the first through the third lower-order multiplex digital reception signals towards the first through the third lower-order digital signal demultiplexers 41 to 43 as will presently become clear. A prescribed one of the lower-order reception signals is delivered to a single identification pattern detecting circuit 85. When the first lower-order reception signal is selected, the single identification pattern detecting circuit 85 is similar in structure to the first identification pattern detecting circuit 56 described in conjunction with FIG. 4 and additionally includes a delay circuit (not shown). The single identification pattern detecting circuit 85 delivers a control signal to the signal distributing circuit 55'. The control signal makes the signal distributing circuit 55' direct the first through the third lower-order reception signals to the first through the third demultiplexers 41 to 43, respectively, when frame synchronism is established between the lower-order transmission and reception signals. If the frame synchronism is in disorder, the single identification pattern detecting circuit 85 gives a delay to the lower-order reception signal supplied thereto. The delay will eventually make the signal distributing circuit 55' deliver the lower-order reception signals correctly towards the respective demultiplexers 41 through 43. When the frame synchronism is confirmed by the above-mentioned frame counter and the synchronizing pattern detector, the delay circuit is controlled so as to give no more delay to the lower-order reception signal supplied to the single identification pattern detecting circuit 85.

While only two embodiments of this invention have thus far been described, it will now readily be possible for one skilled in the art to carry this invention into effect in various other manners. Above all, the multiplex digital communication network may comprise a plurality of higher-order transmitters and a different number of higher-order receivers. The higher-order multiplex digital communication signal may be multiplexed with like digital communication signals. The communication network described in connection with FIG. 6, is very simple in structure and yet is reliable as compared with the conventional system because the frame synchronism need not be established between the higher-rate signals but only between the lower-rate signals.

what is claimed is:

1. A higher-order multiplex digital signal receiver for use in combination with a plurality of lower-order multiplex digital signal receivers and in receiving a higher-order multiplex digital signal into which a predetermined number of lower-order multiplex digital transmission signals are multiplexed with a plurality of identification patterns signal, said identification patterns identifying said lower-order multiplex digital transmission signals and indicating said lower-order multiplex digital signal receivers, wherein the improvement comprises:

demultiplexing means for demultiplexing said higher-order multiplex digital signal into a plurality of lower-order multiplex digital reception signals which are reproductions of the respective lower-order multiplex digital transmission signals, each lower-order multiplex digital reception signal including the identification pattern identifying the lower-order multiplex digital transmission signal of which said each lower-order multiplex digital reception signal is a reproduction;

pattern detecting means responsive to said lower-order multiplex digital reception signals for detecting the identification patterns; and distributing means arranged downstream of said pattern detecting means for distributing said lower-order multiplex digital reception signals towards the lower-order multiplex digital signal receivers in response to the identification patterns included in the respective lower-order multiplex digital reception signals.

2. A higher-order multiplex digital signal receiver as claimed in claim 1, wherein each identification pattern consists of a preselected number of binary bits, two to the power of said preselected number being not less than said predetermined number.

3. A higher-order multiplex digital signal receiver as claimed in claim 1, an n-th one of said lower-order multiplex digital reception signals comprising frame synchronizing bits, data bits, and an n-th reception pattern where n represents each of one through said predetermined number, the reception patterns of the respective lower-order multiplex digital reception signals corresponding to the respective identification patterns, wherein said distributing means comprises n-th gating means supplied with said n-th lower-order multiplex digital reception signal and responsive to said n-th reception pattern for gating the frame synchronizing and the data bits of said n-th lower-order multiplex digital reception signal towards the lower-order multiplex digital signal receiver indicated by said n-th reception pattern.

4. A higher-order multiplex digital signal receiver as claimed in claim 3, wherein said n-th gating means does not gate the frame synchronizing and the data bits of said n-th lower-order multiplex digital reception signal when said n-th lower-order multiplex digital reception signal does not include said n-th reception pattern but a pattern which is specific to none of said lower-order multiplex digital transmission signals.

5. A higher-order multiplex digital signal receiver as claimed in claim 1, each lower-order multiplex digital reception signal comprising frame synchronizing bits, data bits, and a reception pattern, the reception patterns of the respective lower-order multiplex digital reception signals corresponding to the respective identification patterns, wherein said distributing means comprises:

means responsive to a prescribed one of said lower-order multiplex digital reception signals for detecting the reception pattern included therein to produce a control signal; and means responsive to said control signal for distributing the frame synchronizing and the data bits of said lower-order multiplex digital reception signals towards the lower-order multiplex digital signal receivers indicated by said reception patterns, respectively.

6. In a multiplex digital communication network comprising a transmitter for multiplexing a plurality of lower-order multiplex digital transmission signals into a higher-order multiplex digital transmission signal and for sending said higher-order multiplex digital transmission signal to a transmission medium as a multiplex digital communication signal and a receiver for receiving the multiplex digital communication signal from said transmission medium as a higher-order multiplex digital reception signal and for demultiplexing said reception signal into a plurality of lower-order multiplex digital reception signals which are reproductions of predetermined ones of said lower-order multiplex digital transmission signals, the improvement wherein a plurality of bit-interleaved identification patterns are included in each frame of the multiplex digital communication signal, said identification patterns identifying said lower-order multiplex digital transmission signals, said receiver comprising pattern detecting means responsive to said lower-order multiplex digital reception signals for detecting said identification patterns and distributing means arranged downstream of said pattern detecting means for distributing said lower-order multiplex digital reception signals towards the lower-order multiplex digital signal receivers in response to the identification patterns included in the respective lower-order multiplex digital reception signals.

* * * * *

UNITED STATES PATENT AND TRADEMARK OFFICE
CERTIFICATE OF CORRECTION

PATENT NO. : 4,727,542

DATED : February 23, 1988

INVENTOR(S) : ROKUGO ET AL.

It is certified that error appears in the above-identified patent and that said Letters Patent is hereby corrected as shown below:

| | | |
|---|---|---|
| ABSTRACT, LINE 9 | After "12x" delete "I3x" insert --I3z--; |
| COLUMN 2, LINE 61 | Delete "pretetermined" insert --predetermined--; |
| COLUMN 2, LINE 64 | Dlete "interleaaved" insert --interleaved--; |
| COLUMN 4, LINE 22 | After "signals" delete "," insert --.--; |
| COLUMN 4, LINE 50 | Delete "bacome" insert --become--; |
| COLUMN 6, LINE 30 | Delete "thrid" insert --third--; |
| COLUMN 6, LINE 56 | Delete "pattens" insert --patterns--; |
| COLUMN 8, LINE 5 | Delete "gata" insert --gate--; |
| COLUMN 9, CLAIM 3, LINE 2 | Delete "n-th" and insert --$\underline{n}$-th--; |

UNITED STATES PATENT AND TRADEMARK OFFICE
CERTIFICATE OF CORRECTION

PATENT NO. : 4,727,542
DATED : February 23, 1988
INVENTOR(S) : Rokugo et al

It is certified that error appears in the above-identified patent and that said Letters Patent is hereby corrected as shown below:

COLUMN 10, CLAIM 4, LINE 4, Delete "n-th" and insert --$\underline{n}$-th--.

Signed and Sealed this

Twenty-second Day of November, 1988

*Attest:*

DONALD J. QUIGG

*Attesting Officer*  *Commissioner of Patents and Trademarks*